(12) United States Patent
Pickering

(10) Patent No.: US 6,942,255 B2
(45) Date of Patent: Sep. 13, 2005

(54) TWIST FITTING FOR AIR TANK CONNECTIONS

(75) Inventor: Richard Carlton Pickering, Urbana, OH (US)

(73) Assignee: Q3JMC, Inc., Urbana, OH (US)

( * ) Notice: Subject to any disclaimer, the term of this patent is extended or adjusted under 35 U.S.C. 154(b) by 41 days.

(21) Appl. No.: 10/420,226

(22) Filed: Apr. 22, 2003

(65) Prior Publication Data

US 2003/0197375 A1 Oct. 23, 2003

Related U.S. Application Data

(60) Provisional application No. 60/374,731, filed on Apr. 23, 2002.

(51) Int. Cl.[7] .............................................. F16L 27/00
(52) U.S. Cl. ..................... 285/136.1; 285/401; 285/360
(58) Field of Search ............................... 285/23, 139.2, 285/139.3, 140.1, 149.1, 194, 210, 211, 322, 361, 378, 401, 360, 376, 143.1, 203, 204, 209, 391, 154.1

(56) References Cited

U.S. PATENT DOCUMENTS

| | | | | |
|---|---|---|---|---|
| 1,131,339 A | * | 3/1915 | McGinley ................... 554/147 |
| 1,542,703 A | * | 6/1925 | Walter ..................... 285/143.1 |
| 3,243,206 A | * | 3/1966 | Samer ......................... 285/322 |
| 3,514,129 A | * | 5/1970 | Holdren ................... 285/140.1 |
| 3,600,008 A | * | 8/1971 | Barry ........................... 285/39 |
| 3,650,551 A | * | 3/1972 | Akers ....................... 285/143.1 |
| 3,709,526 A | * | 1/1973 | Cromie ......................... 285/73 |
| 4,133,560 A | * | 1/1979 | Ishikawa et al. ............ 285/203 |
| 4,216,930 A | * | 8/1980 | Rossler et al. .............. 285/210 |
| 4,220,808 A | * | 9/1980 | Fujita .......................... 285/322 |
| 4,281,895 A | * | 8/1981 | Mohr .......................... 285/401 |
| 4,354,651 A | * | 10/1982 | Simon ......................... 285/210 |
| 4,449,737 A | * | 5/1984 | Specht ....................... 285/360 |
| 4,474,489 A | * | 10/1984 | Simon ...................... 285/140.1 |
| 4,762,343 A | * | 8/1988 | Hirohata .................. 285/140.1 |
| 5,622,392 A | | 4/1997 | Gochenouer |
| 6,131,958 A | * | 10/2000 | Craig ....................... 285/136.1 |
| 6,193,281 B1 | * | 2/2001 | Nagai et al. ................. 285/360 |
| D475,165 S | * | 5/2003 | Biere et al. .................. D32/31 |
| 6,708,730 B2 | * | 3/2004 | Chikuma et al. ........... 285/209 |

* cited by examiner

Primary Examiner—Aaron Dunwoody
(74) Attorney, Agent, or Firm—Schiff Hardin LLP

(57) ABSTRACT

A fitting connector for a pressure vessel including a bushing for mounting within an aperture defined in a pressure vessel wall. The bushing includes a cylindrical bushing body having a head portion at one end thereof and including at least a pair of locking members for engaging along an interior surface of the pressure vessel wall. The locking members are provided with a contoured surface for engaging with detent members formed on the interior of the pressure vessel wall whereby the bushing is positively locked in a predetermined rotational orientation on the pressure vessel wall and is retained in place until a predetermined torque force is applied.

13 Claims, 6 Drawing Sheets

TWIST FITTING FOR AIR TANK CONNECTIONS

REFERENCE TO PROVISIONAL APPLICATION

This application claims benefit of the filing date of U.S. Provisional Application No. 60/374,731 filed Apr. 23, 2002.

BACKGROUND OF THE INVENTION

The present invention relates to a fitting for use with air tanks and, more particularly, to a fitting including a twist end bushing for interfacing with an opening in an air tank.

Air tanks are typically provided with fittings for connection to tubing or other passageways leading to the air tank. In the past, such fittings have been attached to the air tank by means of a bushing welded to an aperture formed through the wall of the tank. Accordingly, production of the tank requires attention to proper formation of the weld connection and a corresponding labor and manufacturing time cost associated with this operation.

Accordingly, there is a need for a fitting structure for use with air tanks wherein the fitting structure is easily assembled to the tank. In addition, there is a need for such a fitting structure wherein the fitting structure provides a reliable seal with the tank.

SUMMARY OF THE INVENTION

A fitting connection is provided for use with a pressure vessel wherein the fitting connection includes a bushing having a cylindrical bushing body and a head portion located at an upper end of the bushing body. The bushing body is inserted through an aperture in a pressure vessel wall to form an interface between the pressure vessel wall and a fitting, such as a fitting for an air tube leading from the pressure vessel.

In one embodiment, a pair of diametrically opposed locking members are located on the bushing body in spaced relation to the head portion to define a groove between a lower surface of the head portion and an upper surface of the locking members for receiving edge portions of the vessel wall defining the aperture. In addition, an upper surface of each locking member is contoured to increase frictional engagement and provide a resistance to turning of the bushing body when it is mounted to the pressure vessel in order to insure that a predetermined torque force is required to remove or loosen the bushing from the pressure vessel. The contoured surface includes a recess for receiving a detent formed on an interior surface of the pressure vessel wall.

The locking members are further formed with catch elements extending parallel to a longitudinal axis of the bushing body and located in spaced relation to the bushing body. The catch elements include a tang element at a distal end thereof for preventing withdrawal of the bushing body from the aperture.

In a second embodiment, the bushing body has four equally spaced locking members, which have contoured surfaces with recesses to receive the four equally spaced detents on the interior surface of the pressure vessel wall.

Other objects and advantages of the invention will be apparent from the following description, the accompanying drawings and the appended claims.

DETAILED DESCRIPTION OF THE PREFERRED EMBODIMENTS

Figure 1:
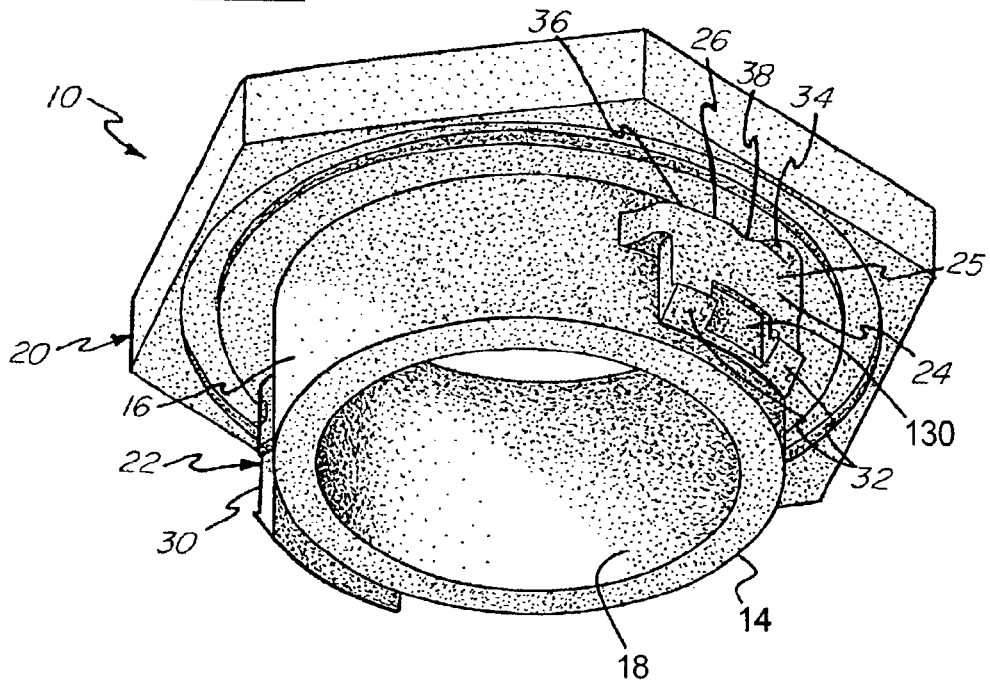
FIG. 1 is a bottom perspective view of the bushing for the fitting connector of the present invention.
Figure 2:
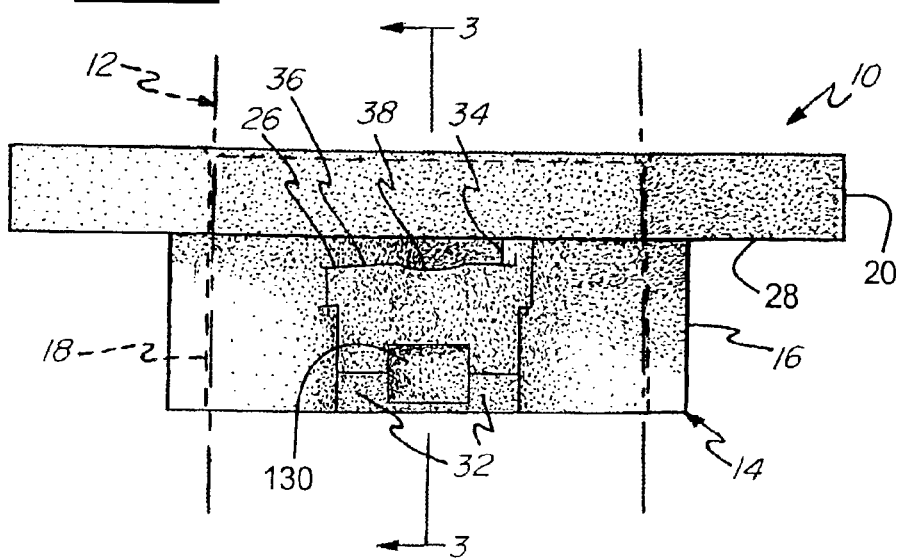
FIG. 2 is a side elevational view of the bushing of FIG. 1.
Figure 3:
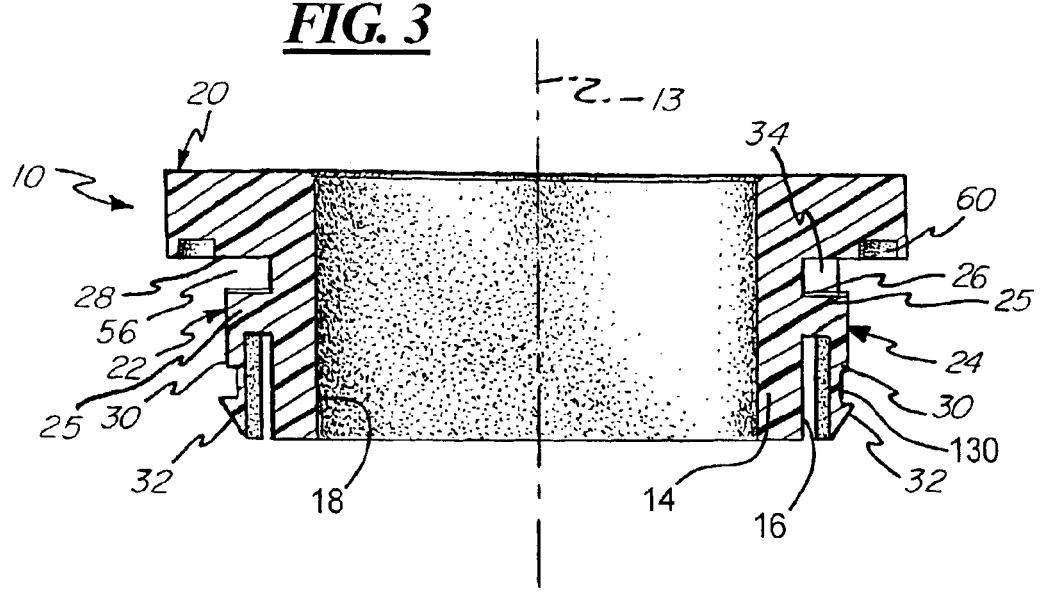
FIG. 3 is a cross-sectional view taken along the line 3—3 of FIG. 2 through the center of the bushing and passing through the locking members.

Referring to FIGS. 1–3, the fitting structure of the present invention includes a bushing 10 for mounting to the wall of a tank and for supporting a fitting, illustrated diagrammatically as 12. The bushing includes a cylindrical body 14 defined by a cylindrical outer surface 16 and a cylindrical inner surface 18 wherein the cylindrical inner surface 18 defines a cylindrical aperture through the bushing 10.

A head portion 20 is formed integrally with and extends radially outwardly from the cylindrical body 14. The head portion 20 defines a tool-engaging portion of the bushing 10 and in the illustrated embodiment is provided with a hexagonal shape for engagement with a wrench.

A pair of locking members 22, 24 are located on diametrically opposite sides of the cylindrical body 14. Each locking member 22, 24 includes a base portion 25 extending radially from the outer surface 16 of the cylindrical body 14 and includes an upper surface 26 facing toward a lower surface 28 of the head portion 20.

Each locking member 22, 24 further includes a catch element 30 extending downwardly from the base portion 25 parallel to a longitudinal axis 13 of the body 14 and in spaced relation to the outer surface 16 of the cylindrical body 14. The catch elements 30 each include a pair of tangs 32, which are separated by a notch or groove 130.

The upper surface 26 of the base portion 25 includes an end wall 34 at one end thereof, and the surface 26 at an opposite end 36 is inclined or ramped slightly upwardly in a direction toward the end wall 34 (see FIG. 2). Further, the upper surface 26 includes a recessed portion 38 intermediate the ends of the upper surface 26.

Figure 4:
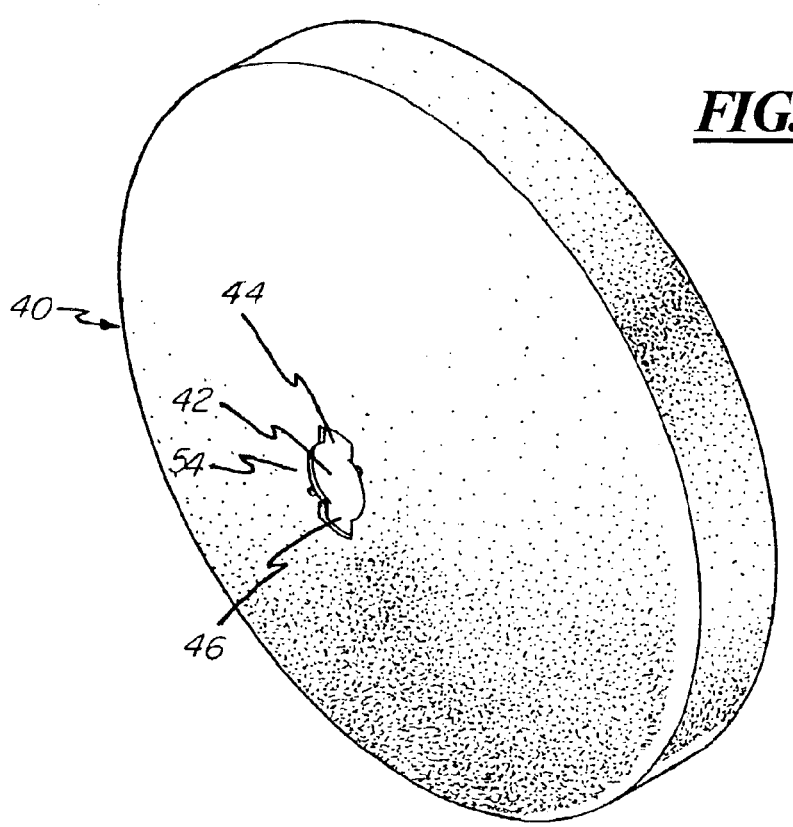
FIG. 4 is a top perspective view of an end wall for a pressure vessel configured for use with the bushing of the present invention.
Figure 5:
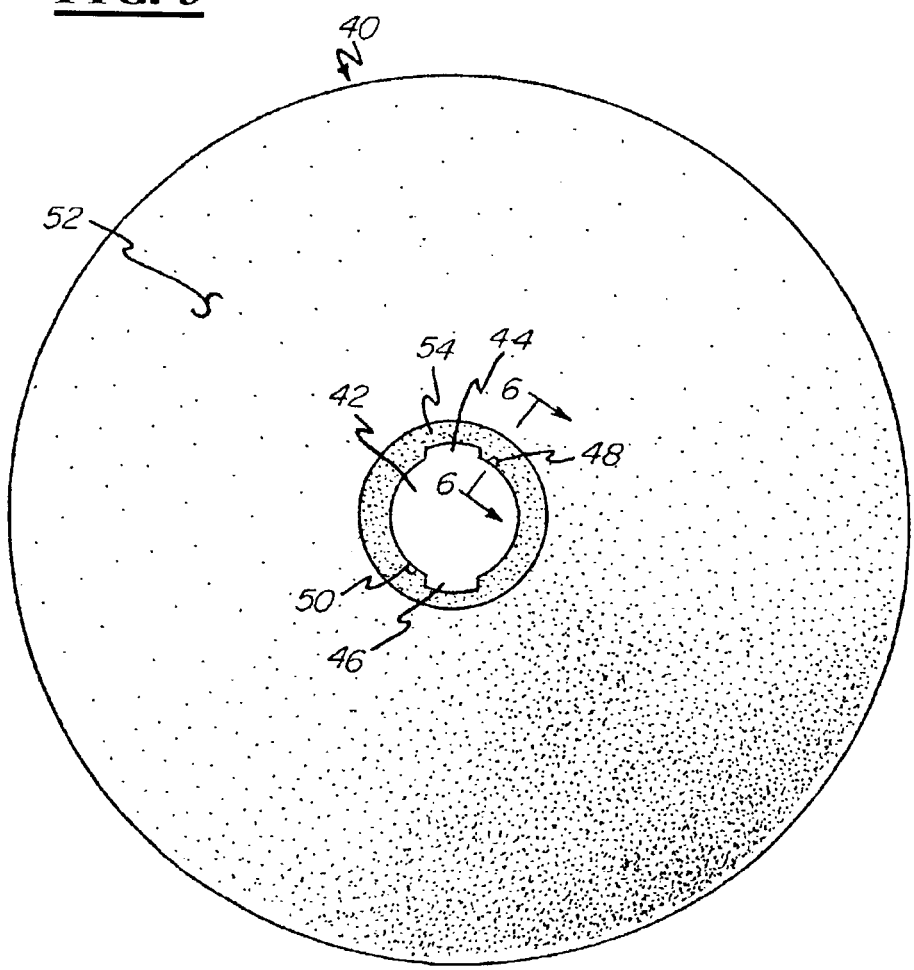
FIG. 5 is an interior plan view thereof.
Figure 6:
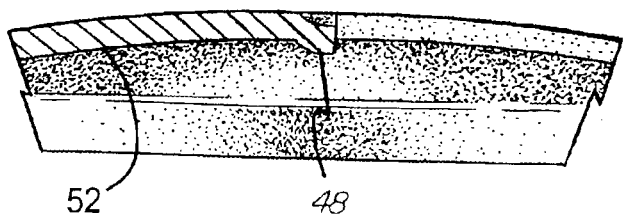
FIG. 6 is a cross-sectional view taken along line 6—6 in FIG. 5.

Referring to FIGS. 4–6, an end wall 40 for an air tank is illustrated and includes an aperture 42 having a diameter closely matching the diameter of the outer surface 16 of the cylindrical body 14. A pair of slots 44, 46 are defined on diametrically opposite sides of the aperture 42 and are formed with a length in a circumferential direction, which corresponds to the circumferential length of the catch elements 30.

In addition, a protruding detent element 48, 50 is located adjacent to each of the slots 44, 46 on an interior surface 52 of the end wall 40, as may be best seen in FIGS. 5 and 6.

It should be noted that the end wall 40 is generally formed with a dome shape. However, the area directly surrounding the aperture 42 is formed as a circular flattened area to define a generally flat annulus area 54.

Figure 7:
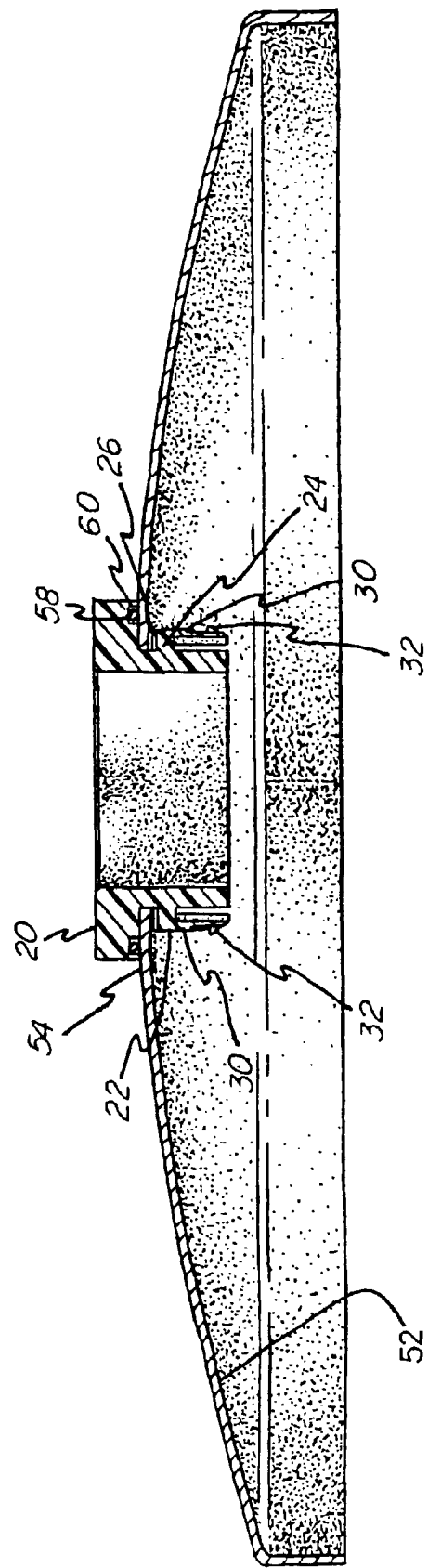
FIG. 7 is a cross-sectional view taken through the assembled bushing and pressure vessel wall.
Figure 8:
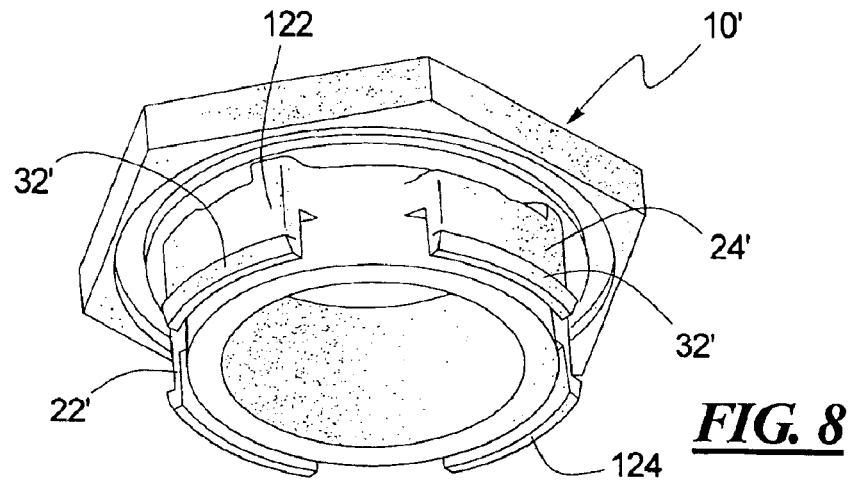
FIG. 8 is a bottom perspective view of a second embodiment of the bushing for the fitting connector of the present invention.
Figure 9:
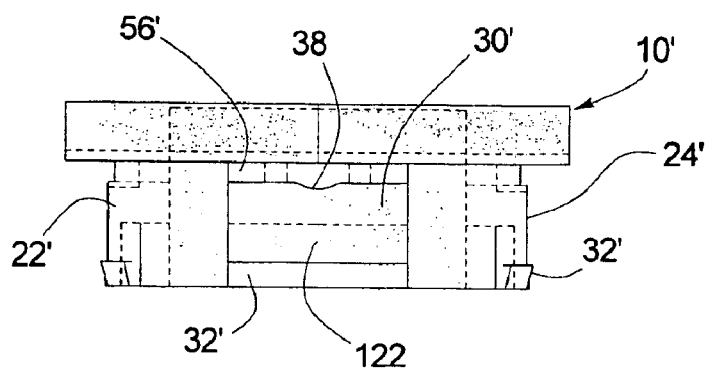
FIG. 9 is a side elevational view of the bushing of FIG. 8.
Figure 10:
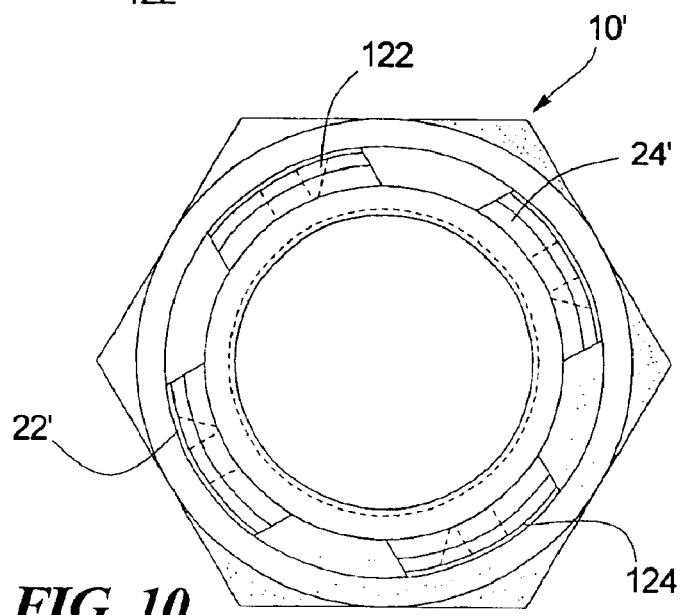
FIG. 10 is a bottom plan view of the bushing of FIG. 8.
Figure 11:
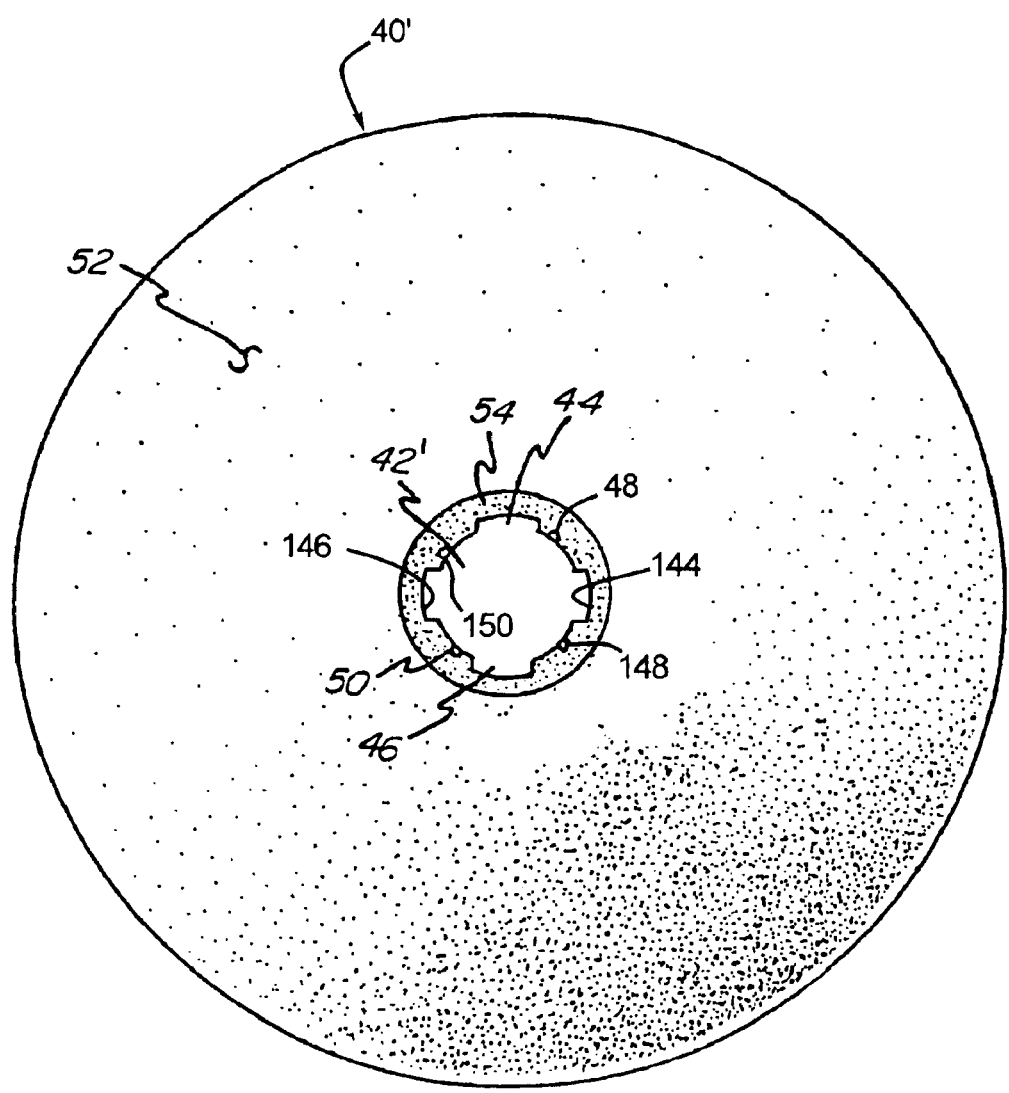
FIG. 11 is an interior plan view of an embodiment of an end wall for a pressure vessel configured for use with the bushing of FIG. 8.

Referring further to FIG. 7, the bushing 10 is assembled to the end wall 40 by inserting the bushing 10 with the locking elements 22, 24 passing through the slots 44, 46. It should be noted that as the locking members 22, 24 pass through the slots 44, 46, the tangs 32 will cause the catch elements 30 to flex inwardly, and further will prevent removal of the bushing 10 from the aperture 42 without application of an inward force on the catch elements 30.

With the bushing 10 fully inserted through the aperture 42, a groove area 56 (see FIG. 3) defined between the upper surface 26 of the locking members 22, 24 and the lower surface 28 of the head portion 20 will be aligned with an edge of the end wall 40. Rotation of the bushing 10 in a clockwise direction will cause the edge of the end wall 40 to pass into the grooves 56. Further, during rotation, the detents 48, 50 will ride along the inclined portions 36 until they engage within the recesses 38 in a stop position. The end walls 34 are located to engage edges of the slots 44, 46 to prevent over-rotation of the bushing 10.

It should be noted that rotation of the bushing 10 results in the detents 48, 50 progressively biasing the head portion 20 into engagement with the upper surface of the end wall 40, and that engagement of the detents 48, 50 within respective recesses 38 provides a predetermined frictional engagement between the bushing 10 and the end wall 40 which requires a predetermined torque force to remove the bushing 10 through counterclockwise rotation. Further, the downward force applied against the head portion 20 results in a sealing force applied against an O-ring 58 located within a groove 60 in the lower surface 28 of the head portion 20. Also, to further facilitate sealing of the head portion 20 against the upper surface of the end wall 40, the upper surface of the end wall 40 is provided with a powder coating to insure a very smooth sealing surface between the O-ring 58 and the end wall 40.

When air pressure is present interiorly of the end wall 40, such as air pressure present within an air tank, the bushing 10 will be biased outwardly, thus increasing the frictional pressure at the engagement between the upper surfaces 26 of the locking members 22, 24 and the detents 48, 50. This additional pressure and frictional force insures that the bushing 10 is prevented from being rotated out of engagement with the end wall 40 when an air pressure is present within the tank.

FIGS. 8–11 show a second embodiment of the bushing generally indicated at 10' for insertion in an end wall 40', which has slots 44 and 46 and additional slots 144 and 146. The four slots 44, 46, 144 and 146 are equally spaced around the opening or aperture 42'. The end wall 40' has the two detents 48 and 50 along with additional detents 148 and 150, so that the four detents are equally spaced around the aperture 42'. The bushing 10' has four equally spaced locking members 22', 122, 24' and 124, whose structure is the same as members 22 and 24, except the catch element 30' of each member does not have the ramped or inclined surface 36 and does not have the groove or notch 130 of the embodiment of FIGS. 1–3 and, thus, each locking member 22', 122, 24' and 124 has a continuous tang 32'. However, each of the elements 30' could be further modified to have an inclined or ramped surface at the open end of the groove 56'.

The bushing 10' is assembled in the end wall 40' in the same manner as the bushing 10 in the end wall 40. The only difference is that the bushing 10' has four locking members 22', 122, 24' and 124, each with a depression or recessed portion 38 instead of just two locking members 22 and 24.

While the form of apparatus herein described constitutes a preferred embodiments of this invention, it is to be understood that the invention is not limited to this precise form of apparatus, and that changes may be made therein without departing from the scope of the invention which is defined in the appended claims.

I claim:

1. A fitting connection for a pressure vessel, the fitting connection comprising:

a cylindrical bushing body having a cylindrical outer surface and defining a longitudinal axis;

a head portion located at an upper end of the bushing body and defining a lower surface;

a passage through the bushing body for passage of a fluid;

at least one locking member having a base portion extending radially from the outer surface of the bushing body, the at least one locking member having an upper surface on the base portion located in spaced relation to the lower surface of the head portion to define a groove for receiving an edge surrounding an aperture in a pressure vessel wall;

the upper surface including a contour varying the distance between the upper surface and the lower surface of the head portion whereby rotation of the bushing within the aperture produces a predetermined frictional force between the locking member and the pressure vessel wall;

the upper surface of the at least one locking member includes a recess for receiving a detent located on the pressure vessel wall, said recess being spaced inward from each end of the upper surface of the at least one locking member.

2. A fitting connection according to claim 1, wherein the upper surface includes an inclined portion leading to the recess.

3. A fitting connection according to claim 1, wherein the upper surface of the at least one locking member includes an end wall for limiting rotation of the bushing body.

4. A fitting connection according to claim 1, wherein the at least one locking member includes a catch element extending from the base portion parallel to the longitudinal axis of the bushing body and in spaced relation to the outer surface of the bushing body, the catch element having a tang for preventing withdrawal of the bushing body from the aperture.

5. A fitting connection for a pressure vessel, the fitting connection comprising:

a bushing including a cylindrical bushing body;

a head portion located at an upper end of the bushing body and defining a lower surface;

a passage through the bushing body for passage of a fluid;

a pressure vessel wall including means defining an aperture;

a detent element located on an interior surface of the pressure vessel wall adjacent an edge of the aperture;

a locking member located on the bushing body. said locking member having an upper surface with a recess spaced inward from each end of the upper surface, said upper surface being in spaced relation to the lower surface to define a groove for receiving the edge of the aperture;

wherein the bushing is rotatable within the aperture, and rotation results in the recess of the locking member engaging the detent element to frictionally lock the bushing in place.

6. A fitting connection according to claim 5, which includes a pair of locking members located on diametrically opposite sides of the bushing body wherein the aperture includes a pair of slots for receiving the locking members.

7. A fitting connection according to claim 6, wherein the locking members each include a catch element extending parallel to the longitudinal axis and in spaced relation to the bushing body, the catch elements preventing withdrawal of the bushing body from the aperture.

8. A fitting connection according to claim 6, wherein the pressure vessel wall includes a detent for each locking member adjacent the aperture.

9. A fitting connection according to claim 5, which includes four locking members spaced around the bushing body and said aperture has equally spaced slots.

10. A fitting connection according to claim 9, wherein the end wall of the pressure vessel has a detent on the interior surface adjacent each of the four slots and each locking member has a recess for receiving the corresponding detent.

11. A fitting connection according to claim 4, wherein the catch element has a pair of tangs separated by a notch.

12. A fitting connection according to claim 1, wherein the lower surface of the head portion has an annular groove receiving a sealing member.

13. A fitting connection according to claim 5, wherein the lower surface of the head portion has an annular groove receiving a sealing member.

* * * * *